(12) United States Patent
He et al.

(10) Patent No.: US 11,108,089 B2
(45) Date of Patent: Aug. 31, 2021

(54) CELL, BATTERY AND ELECTRONIC DEVICE

(71) Applicant: NINGDE AMPEREX TECHNOLOGY LIMITED, Ningde (CN)

(72) Inventors: Jinhua He, Ningde (CN); Xiangrong Chen, Ningde (CN); Xuan Chen, Ningde (CN); Jiaxin An, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 115 days.

(21) Appl. No.: 16/254,353

(22) Filed: Jan. 22, 2019

(65) Prior Publication Data
US 2020/0044274 A1 Feb. 6, 2020

(30) Foreign Application Priority Data

Aug. 6, 2018 (CN) .......................... 201810884400.1

(51) Int. Cl.
*H01M 10/0587* (2010.01)
*H01M 10/04* (2006.01)
*H01M 50/531* (2021.01)

(52) U.S. Cl.
CPC ..... *H01M 10/0587* (2013.01); *H01M 10/045* (2013.01); *H01M 10/0431* (2013.01); *H01M 10/0459* (2013.01); *H01M 50/531* (2021.01)

(58) Field of Classification Search
CPC ........... H01M 10/0431; H01M 10/045; H01M 10/0459; H01M 10/049; H01M 10/0525; H01M 10/0587; H01M 10/1049

(Continued)

(56) References Cited

U.S. PATENT DOCUMENTS 9,040,202 B2 * 5/2015 Kim ..................... H01M 50/571
429/252
2002/0004161 A1 * 1/2002 Yamaguchi ....... H01M 10/0587
429/94

(Continued)

FOREIGN PATENT DOCUMENTS

CN 203800133 U 8/2014
CN 206585017 U 10/2017

(Continued)

OTHER PUBLICATIONS

Ningde Amperex Technology Ltd., Office Action for CN201810884400.1, dated Jul. 31, 2020, 12 pgs.

*Primary Examiner* — Gregg Cantelmo
(74) *Attorney, Agent, or Firm* — Morgan, Lewis & Bockius LLP (57) ABSTRACT

The present disclosure relates to a cell, a battery and an electronic device. The cell includes a first electrode sheet and a second electrode sheet. The first electrode sheet includes a first current collector. The second electrode sheet includes a second current collector. The second current collector includes a starting section and a first bending segment connected to the starting section. A current collector opposite to the starting section and the first bending segment is configured as the second current collector. Thus, the cell is not internally provided with an opposite region between the first current collector and the second current collector, which may enhance the energy density of the cell and improve the safety of the cell.

17 Claims, 7 Drawing Sheets

(58) Field of Classification Search
USPC .......................................................... 429/94
See application file for complete search history.

(56) References Cited

U.S. PATENT DOCUMENTS

| | | | | |
|---|---|---|---|---|
| 2009/0297929 A1* | 12/2009 | Uchida | ............. | H01M 10/0431 |
| | | | | 429/94 |
| 2011/0027636 A1* | 2/2011 | Lee | ..................... | H01M 2/1673 |
| | | | | 429/94 |
| 2011/0244318 A1* | 10/2011 | Cho | ................... | H01M 2/0207 |
| | | | | 429/186 |
| 2011/0274982 A1* | 11/2011 | Kaneko | ............. | H01M 10/0587 |
| | | | | 429/303 |
| 2013/0045405 A1* | 2/2013 | Ahn | ........................ | H01M 2/18 |
| | | | | 429/94 |
| 2014/0050955 A1* | 2/2014 | Mank | ................. | H01M 2/0287 |
| | | | | 429/94 |
| 2015/0064519 A1* | 3/2015 | Hong | ................. | H01M 10/637 |
| | | | | 429/62 |
| 2016/0268581 A1* | 9/2016 | Ahn | ..................... | H01M 2/263 |

FOREIGN PATENT DOCUMENTS

| | | | | | |
|---|---|---|---|---|---|
| KR | 20080047153 | A | * | 5/2008 | |
| WO | WO-2017219345 | A1 | * | 12/2017 | ............. H01M 4/70 |

* cited by examiner

FIG. 14 ic Patent Application Serial No. 201810884400.1, filed with the State Intellectual Property Office of P. R. China on Aug. 6, 2018, the entire content of which is incorporated herein by reference.

CELL, BATTERY AND ELECTRONIC DEVICE

CROSS-REFERENCE TO RELATED APPLICATION

This application claims priority to Chinese Patent Application Serial No. 201810884400.1, filed with the State Intellectual Property Office of P. R. China on Aug. 6, 2018, the entire content of which is incorporated herein by reference.

FIELD

The present disclosure relates to a field of batteries, and more particularly relates to a cell, a battery and an electronic device.

BACKGROUND

With the development of commercialization of lithium-ion batteries, a market demand for energy density of batteries is getting higher and higher. An internal winding structure of a conventional cell requires winding vacant layers of separator during winding, resulting in four additional layers of separator internally. The space utilization rate is reduced, thereby affecting the energy density of the battery.

In order to improve the energy density of the battery, the existing cell structure internally omits two layers of separator, and includes a first electrode sheet, a second electrode sheet, a first electrode tab, and a second electrode tab. A head of a starting end of the first electrode sheet is provided with a blank aluminum foil. The blank aluminum foil is longer than a blank copper foil. That is, the blank aluminum foil and the blank copper foil are opposite to each other. The two electrode tabs are respectively disposed in an interior of an electrode assembly and distributed at two sides thereof, so that the first electrode tab needs to be provided with two insulating adhesive tapes for protection, and a starting position of the blank aluminum foil corresponding to a position of the blank copper foil also needs to be applied with an insulating adhesive tape to avoid an internal short circuit.

However, the energy density of the above-mentioned existing cell structure still needs to be improved, and the blank aluminum foil in this structure is longer than the blank copper foil. And welding burrs of the second electrode tab are hard, which is easy to pierce the separator between the blank aluminum foil and the blank copper foil, and further causes the aluminum foil to be in direct contact with the copper foil and the resulting occurrence of the short circuit, such that there will be a high safety risk, and for a narrower cell, the two electrode tabs do not be processed when they are welded internally.

SUMMARY

The present disclosure seeks to solve at least one of the problems existing in the related art. One aspect of the present disclosure is to provide a cell, which may further improve energy density thereof, and may also avoid a short circuit of the cell, and thus may improve safety of the cell.

The cell according to the present disclosure includes a first electrode sheet and a second electrode sheet. The first electrode sheet includes a first current collector and a first active material layer provided on a surface of the first current collector. The second electrode sheet includes a second current collector and a second active material layer provided on a surface of the second current collector. The second current collector includes a starting section and a first bending segment connected to the starting section. A current collector opposite to the starting section and the first bending segment is configured as the second current collector.

In some embodiments of the present disclosure, the cell further includes a separator disposed between the first electrode sheet and the second electrode sheet.

In some embodiments of the present disclosure, the second current collector further includes a first intermediate segment connected to the first bending segment; a second bending segment connected to the first intermediate segment; a second intermediate segment connected to the second bending segment; and a third bending segment connected to the second intermediate segment, in which no more than two layers of the separator are disposed between the starting section and the first intermediate segment.

In some embodiments of the present disclosure, no more than four layers of the separator are disposed between the first intermediate segment and the second intermediate segment.

In some embodiments of the present disclosure, the separator includes a separator starting section, and the separator starting section extends beyond an end of the starting section of the second current collector in a winding direction of the cell.

In some embodiments of the present disclosure, the separator between a starting end of the separator and a starting end of the first current collector is not provided with a protective layer.

In some embodiments of the present disclosure, two surfaces of a starting end of the first current collector are provided with the first active material layer.

In some embodiments of the present disclosure, two surfaces of the starting section and the first bending segment are not provided with the second active material layer, and in a direction facing towards a center of the cell, a surface of the second current collector between the first intermediate segment and the third bending segment is not provided with the second active material layer.

In some embodiments of the present disclosure, two surfaces of a tail end of the second current collector are provided with the second active material layer.

In some embodiments of the present disclosure, the cell further includes a first electrode tab and a second electrode tab, the first electrode tab is disposed on a surface of the first current collector, and the second electrode tab is disposed on a surface of the starting section of the second current collector.

In some embodiments of the present disclosure, the first electrode tab does not overlap with the second electrode tab in a thickness (T) direction of the cell.

In some embodiments of the present disclosure, the first current collector includes a fourth bending segment and a finishing section, the fourth bending segment is connected to the finishing section, surfaces of the fourth bending segment and the finishing section are not provided with the first current collector active material layer, and the first electrode tab is disposed on a surface of the finishing section of the first current collector.

In some embodiments of the present disclosure, the finishing section of the first current collector does not overlap the starting section of the second current collector in a thickness (T) direction of the cell.

In some embodiments of the present disclosure, a sum of a thickness of the first electrode tab and a thickness of the finishing section of the first current collector is h1, and a sum of a thickness of the second electrode tab and a thickness of the starting section of the second current collector is h2, an absolute value of a difference between h1 and h2 is greater than or equal to 0 µm, and less than or equal to 30 µm.

In some embodiments of the present disclosure, in a width (W) direction of the cell, a distance between the first electrode tab and an end of the finishing section is greater than or equal to 3 mm, and a distance between the second electrode tab and an end of the starting section is greater than or equal to 3 mm.

In some embodiments of the present disclosure, along a winding direction of the cell, the fourth bending segment extends beyond a tail end of the second current collector, and a bending segment of the second current collector corresponding to the fourth bending segment is defined as a fifth bending segment; and the separator includes a separator finishing section disposed between the fourth bending segment and the fifth bending segment, and the separator finishing section includes at least two layers of the separator.

In some embodiments of the present disclosure, the separator of the separator finishing section is not provided with a protective layer.

In some embodiments of the present disclosure, the separator finishing section does not overlap with the finishing section of the first current collector in a thickness (T) direction of the cell.

In some embodiments of the present disclosure, another surface of the finishing section of the first current collector corresponding to the first electrode tab is provided with an insulating adhesive or a hot melt adhesive.

In some embodiments of the present disclosure, a surface of the first electrode tab is provided with an insulating adhesive or a hot melt adhesive.

In some embodiments of the present disclosure, in a winding direction of the cell, an end of the finishing section of the first current collector is provided with a finishing tape to fix the finishing section.

In some embodiments of the present disclosure, a hot melt adhesive is disposed on a side of the cell corresponding to the finishing tape.

In some embodiments of the present disclosure, in a width (W) direction of the cell, a difference between a distance between the first electrode tab and the second electrode tab and a width of the finishing tape is greater than or equal to 3 mm.

In some embodiments of the present disclosure, the separator starting section includes a first separator starting segment and a second separator starting segment, and the starting section of the second current collector is disposed between the first separator starting segment and the second separator starting segment; in the winding direction of the cell, a portion from a winding start point of the first separator starting segment to a position where the first separator starting segment is bent for the first time is defined as a first separator bending segment, and a portion from a winding start point of the second separator starting segment to a position where the second separator starting segment is bent for the first time is defined as a second separator bending segment; the first separator starting segment further includes a first separator segment, a second separator segment and a third separator segment, the first separator segment is disposed between the first separator bending segment and the second separator segment, and the second separator segment is disposed between the first separator segment and the third separator segment. Wherein in a width (W) direction of the cell, the first separator bending segment and the second separator bending segment are respectively disposed between the first separator segment and the second separator segment.

In some embodiments of the present disclosure, the cell further includes a first electrode tab and a second electrode tab, the first electrode tab is disposed on a surface of the first current collector, and the second electrode tab is disposed on a surface of the starting section of the second current collector, in which in a thickness (T) direction of the cell, the first electrode tab and the second electrode tab do not respectively overlap with the first separator bending segment.

In some embodiments of the present disclosure, in the winding direction of the cell, a portion from a winding start point of the starting section of the second current collector to a position where the starting section is bent for the first time is defined as a bending portion, and the bending portion is disposed between the first separator bending segment and the second separator bending segment.

In some embodiments of the present disclosure, in a thickness (T) direction of the cell, the first electrode tab and the second electrode tab do not respectively overlap with the bending portion.

Another aspect of the present disclosure is to provide a battery including a cell of any one of the above structure.

Another aspect of the present disclosure is to provide an electronic device, the electronic device includes a housing and a battery disposed in the housing, and the battery includes a cell of any one of the above structure.

According to the cell of the present disclosure, the cell is not internally provided with an opposite region between the first current collector and the second current collector. This arrangement may make it unnecessary to apply an insulating adhesive on a surface of the electrode tab inside the cell, and may omit a first current collector with this opposite region in a cell structure of the related art, such as the first current collector disposed between the starting section and the second intermediate segment of the second current collector, and disposed between the first bending segment and the third bending segment, or the like, such that a thickness of the cell may become smaller, and the energy density of the cell may be increased, thereby improving operational performance thereof. Additionally, since the opposite region is not provided, the second current collector is not in direct contact with the first current collector inside the cell, and an internal short circuit of the cell may be prevented, thereby further improving the safety of the cell.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS cell 10;
first electrode sheet 1;
first current collector 11;
fourth bending segment 111;
finishing section 112;
starting end 113;
first active material layer 12;
second electrode sheet 2;
second current collector 21;
starting section 211;
first bending segment 212;
first intermediate segment 213;
second bending segment 214;
second intermediate segment 215;
third bending segment 216;
fifth bending segment 217;
tail end 218;
bending portion 219;
second active material layer 22;
separator 3;
separator starting section 31;
first separator starting segment 311;
first separator segment 311a;
second separator segment 311b;
third separator segment 311c;
first separator bending section 311d;
separator finishing section 32;
second separator starting segment 312;
second separator bending section 312d;
first electrode tab 4;
second electrode tab 5;
finishing tape 6.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

A cell 10 according to embodiments of the present disclosure will be described in the following with reference to FIGS. 1 to 14.

As illustrated in FIGS. 1 to 14, the cell 10 according to embodiments of the present disclosure includes a first electrode sheet 1 and a second electrode sheet 2. It should be noted that, if the first electrode sheet 1 is a positive electrode sheet of the cell 10, the second electrode sheet 2 is a negative electrode sheet of the cell 10. And if the second electrode sheet 2 is the positive electrode sheet of the cell 10, the first electrode sheet 1 is the negative electrode sheet of the cell 10. A material for manufacturing the positive electrode sheet may be aluminum foil or others metal foils, and a material for manufacturing the negative electrode sheet may be copper foil or others metal foils.

The first electrode sheet 1 may include a first current collector 11 and a first active material layer 12. The first active material layer 12 may be disposed on a surface of the first current collector 11. The second electrode sheet 2 may include a second current collector 21 and a second active material layer 22. The second current collector 21 may include a starting section 211 and a first bending segment 212. The first bending segment 212 is connected with the starting section 211. The second active material layer 22 may be disposed on a surface of the second current collector 21. Both of the first active material layer 12 and the second active material layer 22 have a conductive effect, and the cell 10 may meet working requirements by providing the first active material layer 12 and the second active material layer 22. Thereby, operational reliability of the cell 10 may be ensured.

Furthermore, a current collector opposite to the starting section 211 and the first bending segment 212 is configured as the second current collector 21. That is, the cell 10 is not internally provided with an opposite region between the first current collector 11 and the second current collector 21. This arrangement may make it unnecessary to apply an insulating adhesive on a surface of the electrode tab inside the cell 10, and may omit a first current collector 11 with this opposite region in a cell structure of the related art, such that a thickness of the cell may become smaller, and energy density of the cell may be increased. Additionally, since the opposite region is not provided, the second current collector 21 is not in direct contact with the first current collector 11 inside the cell 10, and an internal short circuit of the cell 10 may be prevented, thereby further improving the safety of the cell 10.

In some embodiments of the present disclosure, as illustrated in FIGS. 1 to 14, the cell 10 may further include a separator 3, and the separator 3 may be disposed between the first electrode sheet 1 and the second electrode sheet 2. The separator has an isolation effect, and may better prevent the second current collector 21 from being in direct contact with the first current collector 11, thereby preventing an occurrence of the short circuit of the cell 10.

In some embodiments of the present disclosure, as illustrated in FIGS. 1 to 14, the second current collector 21 may further include a first intermediate segment 213, a second bending segment 214, a second intermediate segment 215 and a third bending segment 216. An end of the first intermediate segment 213 is connected to the first bending segment 212, an end of the second bending segment 214 is connected to the other end of the first intermediate segment 213. That is, the first intermediate segment 213 is disposed between the first bending segment 212 and the second bending segment 214. An end of the second intermediate segment 215 is connected to the other end of the second bending segment 214, and an end of the third bending segment 216 is connected to the other end of the second intermediate segment 215. That is, the second intermediate segment 215 is disposed between the second bending segment 214 and the third bending segment 216. Wherein no more than two layers of the separator 3 are disposed between the starting section 211 and the first intermediate segment 213. Compared with an existing cell, the cell 10 in the present application may omit at least two layers of the separator 3, such that a thickness of the cell 10 may become smaller, and the energy density of the cell 10 may be increased.

In some embodiments of the present disclosure, no more than four layers of the separator 3 are disposed between the first intermediate segment 213 and the second intermediate segment 215. This arrangement may make a thickness of the cell 10 become smaller, and the energy density of the cell 10 increase higher.

In some embodiments of the present disclosure, as illustrated in FIGS. 1 to 14, the separator 3 may include a separator starting section 31, and in a winding direction of the cell 10, the separator starting section 31 may extend beyond an end of the starting section 211 of the second current collector 21. This arrangement may make the first electrode sheet 1 and the second electrode sheet 2 easier to be wound into the cell 10, and better ensure that the cell 10 will not internally produce the short circuit phenomenon.

In some embodiments of the present disclosure, as illustrated in FIGS. 1 to 14, the separator 3 between a starting end of the separator 3 and a starting end 113 of the first current collector 11 may not be provided with a protective layer. This arrangement may make a thickness of the separator 3 in this portion smaller than that of a remaining portion of the separator 3, such that a thickness of the cell 10 may be further reduced to enhance the energy density of the cell 10.

In some embodiments of the present disclosure, as illustrated in FIGS. 1 to 14, two surfaces of the starting end 113 of the first current collector 11 may be provided with the first active material layer 12. This arrangement may make the starting end 113 of the first current collector 11 have no blank aluminum foil area, and may omit a process of applying an insulating adhesive tape on a blank copper foil area inside the cell 10. Furthermore, there is no blank copper foil opposite to the blank aluminum foil inside the cell 10, obviously reducing the risk of short circuit of the cell 10. Meanwhile, the starting end 113 of the first current collector 11 does not have the blank current collector, further improving energy density of the cell 10.

In some embodiments of the present disclosure, as illustrated in FIGS. 1 to 14, two surfaces of the starting section 211 and the first bending segment 212 of the second current collector 21 are not provided with the second active material layer 22. And in a direction facing towards a center of the cell 10, surfaces of the first intermediate segment 213, the second bending segment 214, the second intermediate segment 215 and the third bending segment 216 (i.e., a surface of the second current collector 21 between the first intermediate segment 213 and the third bending segment 216) are not provided with the second active material layer 22, such that a thickness of the cell 10 may be further reduced to enhance energy density of the cell 10.

In some embodiments of the present disclosure, as illustrated in FIGS. 1 to 14, two surfaces of a tail end 218 of the second current collector 21 may be provided with the second active material layer 22. This arrangement may ensure that the tail end 218 of the second current collector 21 may be not in direct contact with the first current collector 11, and better avoid an occurrence of the short circuit inside the cell 10, thereby improving the safety of the cell 10. Additionally, the tail end 218 of the second current collector 21 does not have the blank current collector, thereby further enhancing the energy density of the cell 10.

In some embodiments of the present disclosure, as illustrated in FIGS. 1 to 14, the cell 10 may further include a first electrode tab 4 and a second electrode tab 5. The first electrode tab 4 may be disposed on a surface of the first current collector 11, and the second electrode tab 5 may be disposed on a surface of the starting section 211 of the second current collector 21. It should be understood that, the first electrode tab 4 may be welded on the first current collector 11, and the second electrode tab 5 may be welded on the second current collector 21. This arrangement enables the first electrode tab 4 to be reliably assembled on the first current collector 11, and also enables the second electrode tab 5 to be reliably assembled on the second current collector 21, thereby enhancing structural strength of the cell 10. Additionally, the first electrode tab 4 may be formed by directly cutting the first current collector 11, the second electrode tab 5 may be formed by directly cutting the second current collector 21, such that a thickness of the cell 10 may be further reduced, and energy density of the cell 10 may be further enhanced.

In some embodiments of the present disclosure, in a thickness (T) direction of the cell 10, the first electrode tab 4 does not overlap with the second electrode tab 5. This arrangement may decrease a thickness of the cell 10, thereby further enhancing the energy density of the cell 10.

In some embodiments of the present disclosure, as illustrated in FIGS. 1 to 14, the first current collector 11 may include a fourth bending segment 111 and a finishing section 112. The fourth bending segment 111 is connected to the finishing section 112, two surfaces of the fourth bending segment 111 and the finishing section 112 are not respectively provided with the first active material layer 12, and the first electrode tab 4 may be disposed on a surface of the finishing section 112 of the first current collector 11. It should be noted that, the first electrode tab 4 may be welded on the finishing section 112 of the first current collector 11, and the second electrode tab 5 is welded on a surface of the starting section 211 of the second current collector 21. As illustrated at portion a in FIGS. 1 to 14, the starting end 113 of the first electrode sheet 1 does not have the blank aluminum foil, which will not cause a short circuit between the copper foil and the aluminum foil, a short circuit between the second electrode tab 5 and the aluminum foil, and a short circuit between the first electrode tab 4 and the copper foil, thereby further improving the safety of the cell 10.

In some embodiments of the present disclosure, in the thickness (T) direction of the cell 10, the finishing section 112 of the first current collector 11 does not overlap with the starting section 211 of the second current collector 21. This arrangement may decrease a thickness of the cell 10, thereby further enhancing the energy density of the cell 10.

In some embodiments of the present disclosure, a sum of the thickness of the first electrode tab 4 and that of the finishing section 112 of the first current collector 11 is h1, a sum of the thickness of the second electrode tab 5 and that of the starting section 211 of the second current collector 21 is h2, and an absolute value of a difference between h1 and h2 is greater than or equal to 0 µm, and less than or equal to 30 µm. The smaller a difference of the thickness of the cell 10 between the first electrode tab 4 and the second electrode tab 5 is, the better the overall flatness of the cell 10 is, and the better a bonding effect between interfaces of the cell 10 is, which facilitates to improve the cycle performance of the cell 10. And an absolute value of the difference between h1 and h2 have a range between 0 µm and 30 µm, which may improve the flatness of the cell 10, and facilitate to improve the energy density of the cell 10, and ensure that the cycle performance of the cell 10 is not affected. Furthermore, this arrangement also may decrease a thickness of the cell 10 in maximum extent, and further enhance the energy density of the cell 10.

In some embodiments of the present disclosure, in a width (W) direction of the cell 10, a distance between the first electrode tab 4 and an end of the finishing section 112 is greater than or equal to 3 mm, and a distance between the second electrode tab 5 and an end of the starting section 211 is greater than or equal to 3 mm. It should be noted that, the first electrode tab 4 may not align with the end of the finishing section 112, and the second electrode tab 5 may not align with the end of the starting section 211, such that the position arrangement of the first electrode tab 4 and the second electrode tab 5 may be more reasonable, thereby facilitating realization of the winding process.

In some embodiments of the present disclosure, as illustrated in FIGS. 1 to 14, along the winding direction of the cell 10, the fourth bending segment 111 extends beyond the tail end 218 of the second current collector 21, a bending segment of the first current collector 11 corresponding to the fourth bending segment 111 is defined as a fifth bending segment 217, such that the first electrode sheet 1 and the second electrode sheet 2 may be better wound together. Meanwhile, the fourth bending segment 111 may protect the cell 10, thereby further improving the safety of the cell 10.

The separator 3 may include a separator finishing section 32, the separator finishing section 32 may be disposed between the fourth bending segment 111 and the fifth bending segment 217, and the separator finishing section 32 may include at least two layers of the separator 3. This arrangement may prevent the first current collector 11 from directly contacting with the second current collector 21 or the second active material layer 22, which may avoid the occurrence of a short circuit. Meanwhile, surfaces of the fourth bending segment 111 and the fifth bending segment 217 may also be provided with an insulating adhesive thereon, thereby further improving the safety of the cell 10.

In some embodiments of the present disclosure, the separator 3 of the separator finishing section 32 is not provided with a protective layer, which may further decrease a thickness of the cell 10, and hence further enhance the energy density thereof.

In some embodiments of the present disclosure, in the thickness (T) direction of the cell 10, the separator finishing section 32 does not overlap with the finishing section 112 of the first current collector 11. This arrangement facilitates to decrease a thickness of the cell 10, thereby further enhancing the energy density of the cell 10.

In some embodiments of the present disclosure, another surface of the finishing section 112 of the first current collector 11, corresponding to the first electrode tab 4, may be provided with an insulating adhesive or a hot melt adhesive, such that the risk of the short circuit caused by the burrs of the electrode tab piercing the separator 3 may be reduced. Furthermore, the first electrode tab 4 may also not be applied with the insulating adhesive and the hot melt adhesive, such that the thickness of the cell 10 may be decreased to further enhance the energy density of the cell 10.

In some embodiments of the present disclosure, a surface of the first electrode tab 4 may be provided with the insulating adhesive or the hot melt adhesive. This arrangement may prevent the burrs of the first electrode tab 4 from puncturing a packaging bag, and avoid an occurrence of a packaging failure problem.

In some embodiments of the present disclosure, in the winding direction of the cell 10, the end of the finishing section 112 of the first current collector 11 may be provided with a finishing tape 6. The finishing tape 6 has viscidity, and the finishing section 112 of the first current collector 11 may be fixed by providing the finishing tape 6, such that the finishing section 112 of the first current collector 11 may be prevented from being displaced, compactness of the cell 10 may be ensured, and the structural strength of the cell 10 may be improved.

In some embodiments of the present disclosure, another side of the cell 10 corresponding to the finishing tape 6 may be provided with a hot melt adhesive, such that the cell 10 may be fixed inside the packaging bag more firmly.

In some embodiments of the present disclosure, in the width (W) direction of the cell 10, a difference between a distance between the first electrode tab 4 and the second electrode tab 5 and a width of the finishing tape 6 is greater than or equal to 3 mm, such that the finishing tape 6 may not overlap with the first electrode tab 4 or the second electrode tab 5, and the thickness of the cell 10 can be decreased, thereby enhancing the energy density of the cell 10.

In some embodiments of the present disclosure, as illustrated in FIGS. 1 to 14, the separator starting section 31 may include a first separator starting segment 311 and a second separator starting segment 312, and in the thickness (T) direction of the cell 10, the starting segment 211 of the second current collector 21 may be disposed between the first separator starting segment 311 and the second separator starting segment 312.

In the winding direction of the cell 10, a portion from a winding start point of the first separator starting segment 311 to a position where the first separator starting segment 311 is bending for the first time is defined as a first separator bending segment 311d, and a portion from a winding start point of the second separator starting segment 312 to a position where the second separator starting segment 312 is bending for the first time is defined as a second separator bending segment 312d. The first separator starting segment 311 may further include a first separator segment 311a, a second separator segment 311b and a third separator segment 311c. The first separator bending segment 311d, the first separator segment 311a, and the second separator segment 311b are connected sequentially (i.e., the first separator segment 311a is disposed between the first separator bending segment 311d and the second separator segment 311b), and the second separator segment 311b is connected to the third separator segment 311c. In the thickness (T) direction of the cell 10, the first separator bending segment 311d and the second separator bending segment 312d may be respectively disposed between the first separator segment 311a and the second separator segment 311b.

In some embodiments of the present disclosure, as illustrated in FIGS. 1 to 14, the cell 10 may further include a first electrode tab 4 and a second electrode tab 5. The first electrode tab 4 may be disposed on a surface of the first current collector 11, and the second electrode tab 5 may be disposed on a surface of the starting section 211 of the second current collector 21. In the thickness (T) direction of the cell 10, the first electrode tab 4 and the second electrode tab 5 do not respectively overlap with the first separator bending segment 311d, and/or the first electrode tab 4 and the second electrode tab 5 do not respectively overlap with the second separator bending segment 312d. This arrangement may enhance the space utilization rate of the cell 10, reduce the thickness of the cell 10, and further enhance the energy density of the cell 10.

In some embodiments of the present disclosure, in the winding direction of the cell 10, a portion from a winding start point of the starting section 211 of the second current collector 21 to a position where the starting section 211 is bent for the first time is defined as a bending portion 219, and the bending portion 219 may be disposed between the first separator bending segment 311d and the second separator bending segment 312d, such that this arrangement may facilitate the realization of the winding process.

In some embodiments of the present disclosure, in the thickness (T) direction of the cell 10, the first electrode tab 4 and the second electrode tab 5 do not respectively overlap with the bending portion 219. This arrangement may decrease the thickness of the cell 10, thereby further enhancing the energy density of the cell 10.

As illustrated in FIGS. 1 to 14, the first electrode tab 4 may be applied with an insulating adhesive tape on one surface thereof or two surfaces thereof, or neither of the two surfaces thereof is applied with the insulating adhesive tape, and a head of the first electrode sheet 1 may not be applied the insulating adhesive tape. This arrangement may make the thickness of the cell 10 become smaller, and enhance the energy density of the cell 10.

In the thickness (T) direction of the cell 10, when the first electrode tab 4 is at a right side of the second electrode tab 5, the first separator starting segment 311 (b position in FIGS. 1 to 14) is disposed between the first electrode tab 4 and the second electrode tab 5, the first separator starting segment 311 may not overlap with the first electrode tab 4 or the second electrode tab 5. When the first electrode tab 4 is at a left side of the second electrode tab 5, the first separator starting segment 311 is bendable, and the first separator starting segment 311 may not overlap with the first electrode tab 4 or the second electrode tab 5, as illustrated in FIGS. 6, 7, 11, 12 and 13.

The insulating adhesive at a tail end of the first electrode sheet 1 may not overlap with the first electrode tab 4 in the thickness (T) direction of the cell 10. That is, e position and f position illustrated in FIGS. 1 to 14 may not respectively overlap with the first electrode tab 4. This arrangement may decrease the thickness of the cell 10, thereby further improving the energy density of the cell 10.

Figure 5:
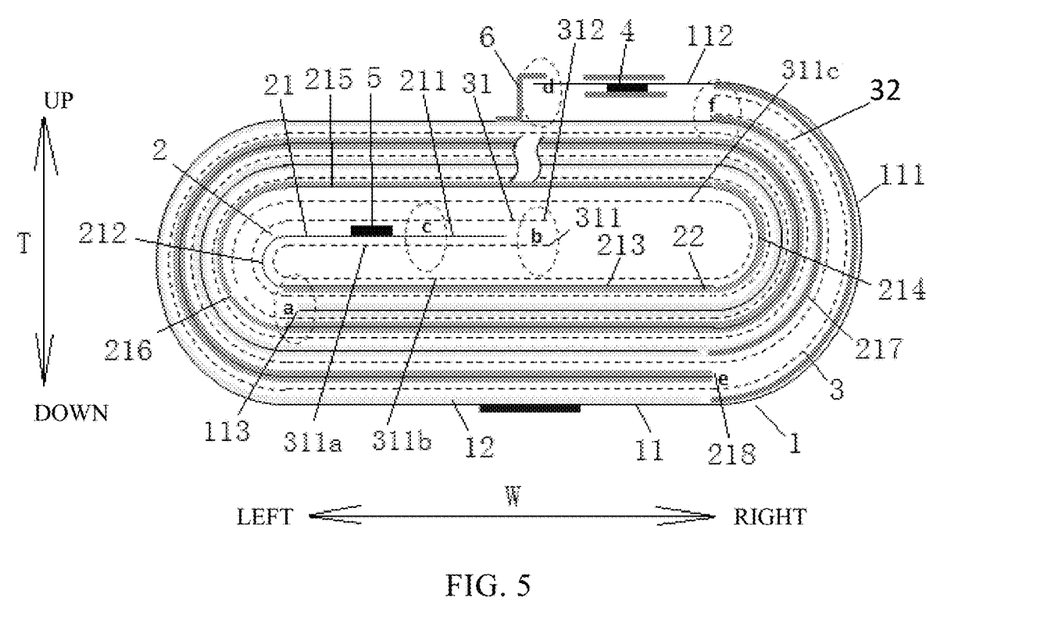
FIG. 5 illustrates a winding schematic view of a cell in accordance with another embodiment of the present disclosure.
Figure 6:
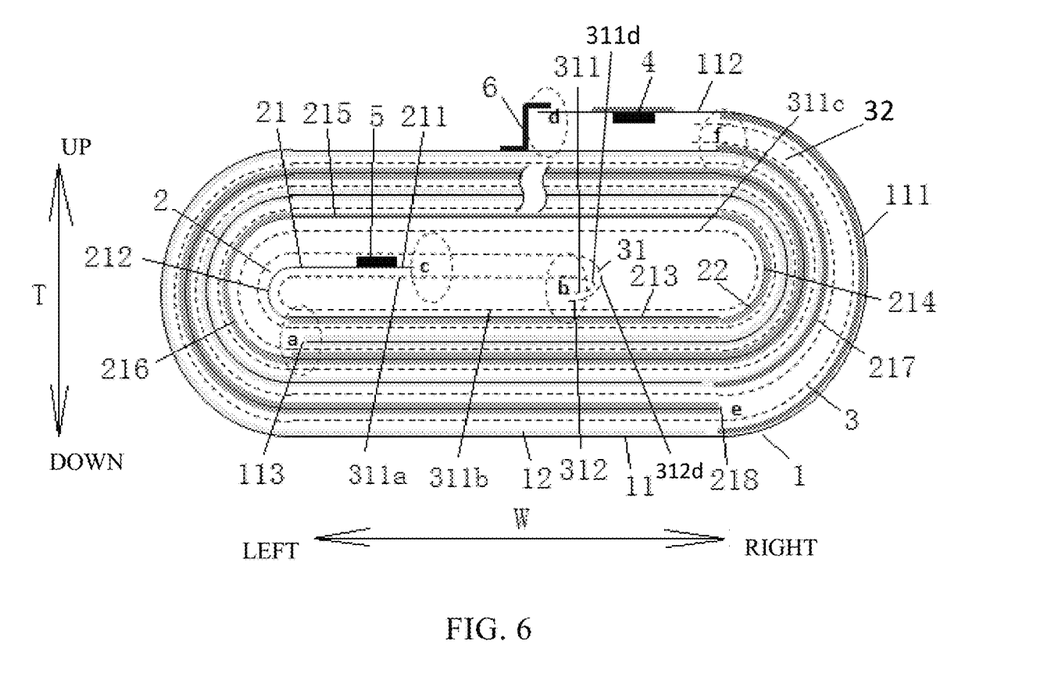
FIG. 6 illustrates a winding schematic view of a cell in accordance with another embodiment of the present disclosure.
Figure 7:
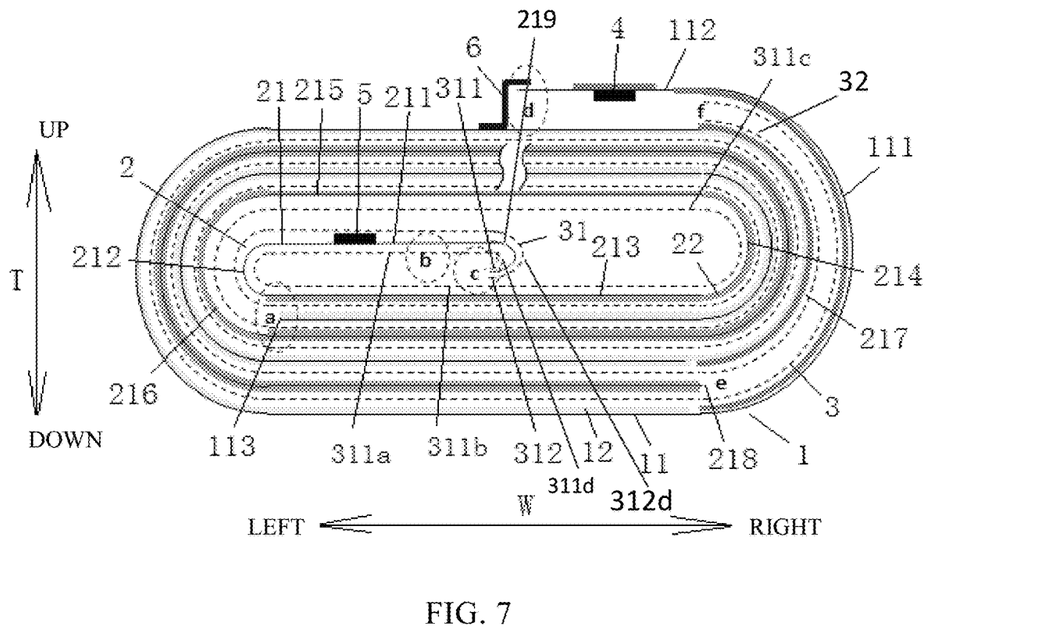
FIG. 7 illustrates a winding schematic view of a cell in accordance with another embodiment of the present disclosure.

In a winding direction of the cell 10, a tail cutting position of the separator 3 (f position illustrated in FIGS. 1 to 14) may align with the separator finishing section 32 (i.e., a length of the separator finishing section 32 is equal to a length of the insulating adhesive), or a length of the separator finishing section 32 is greater than a length of the insulating adhesive (as illustrated in FIG. 6), or a length of the separator finishing section 32 is less than a length of the insulating adhesive (as illustrated in FIG. 7). And in a winding direction of the cell 10, a tail cutting position of the separator 3 need extend beyond the tail end 218 of the second electrode sheet 2. This arrangement may prevent the tail end 218 of the second electrode sheet 2 from coming into contact with the first current collector 11 to cause a short circuit, and thereby ensure the safety reliability of the cell 10.

Figure 8:
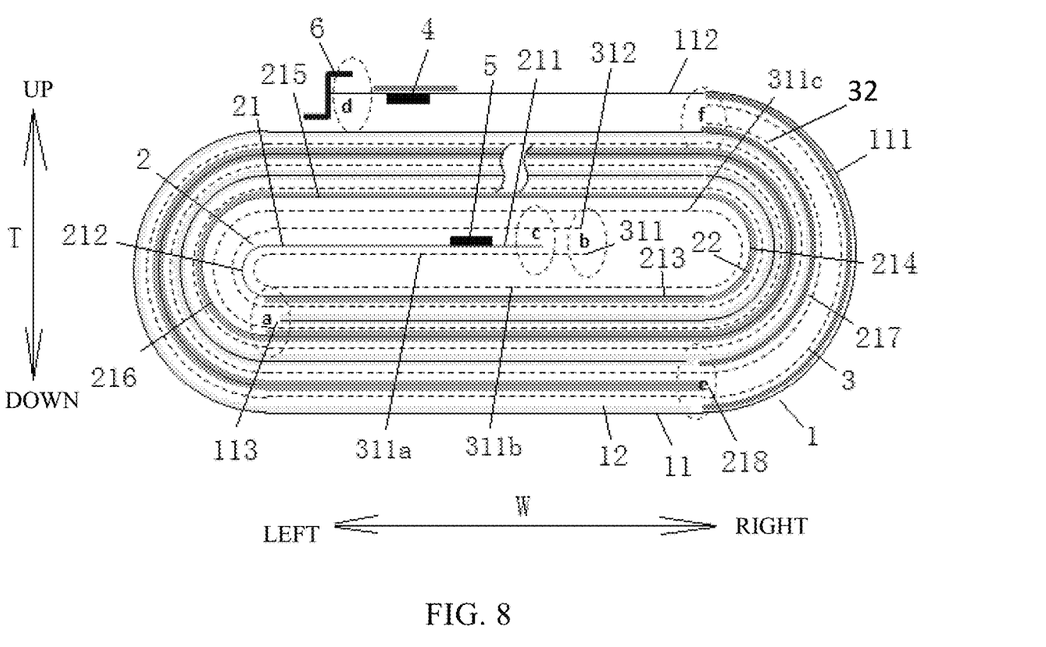
FIG. 8 illustrates a winding schematic view of a cell in accordance with another embodiment of the present disclosure.
Figure 9:
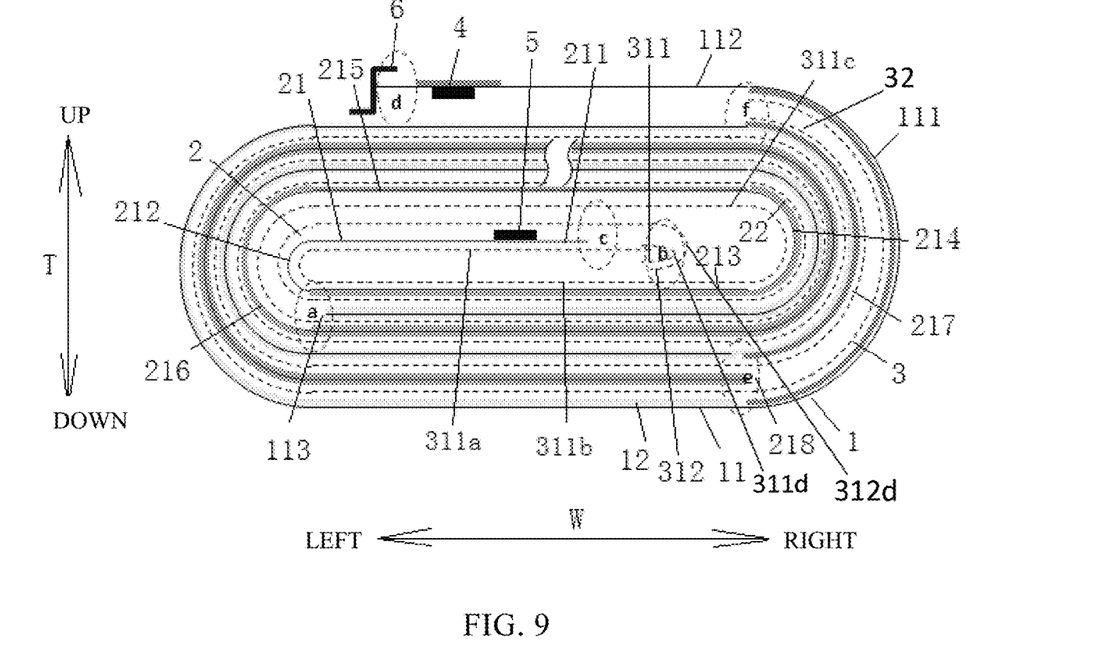
FIG. 9 illustrates a winding schematic view of a cell in accordance with another embodiment of the present disclosure.
Figure 10:
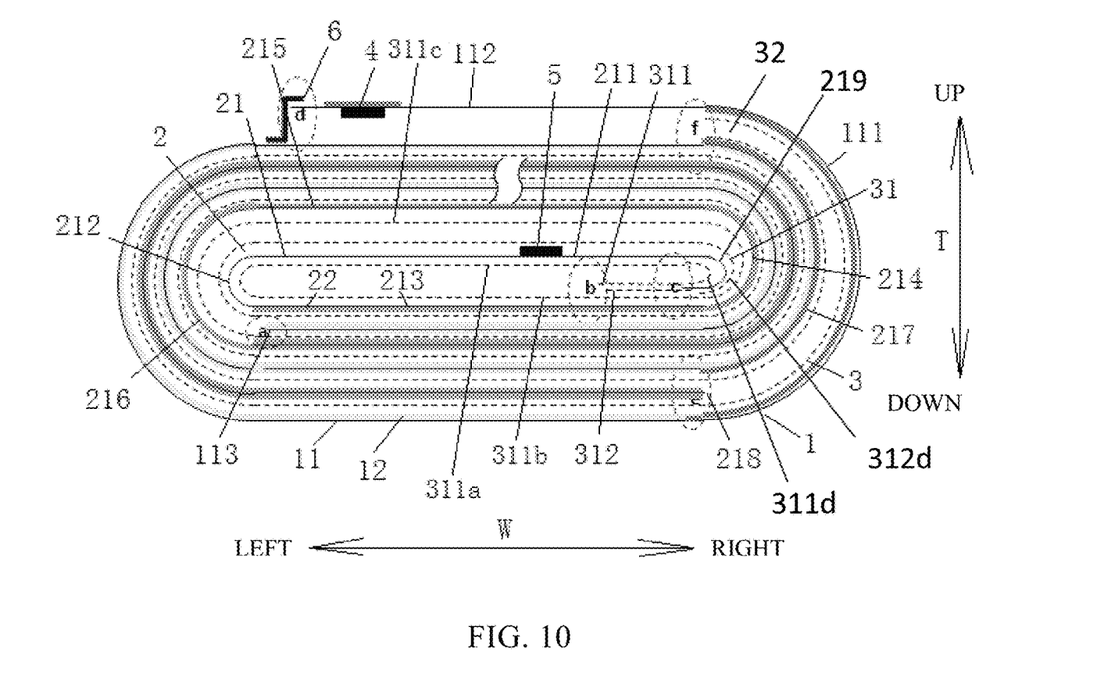
FIG. 10 illustrates a winding schematic view of a cell in accordance with another embodiment of the present disclosure.

The c position illustrated in FIGS. 1 to 14 does not overlap with the first electrode tab 4, as illustrated in FIG. 9, and the c position does not overlap with the second electrode tab 5 (as illustrated in FIG. 10), such that the thickness of the cell 10 may be decreased, and the energy density of the cell 10 may be further improved. Additionally, the d position illustrated in FIGS. 1 to 7 may not overlap with the second electrode tab 5, which may decrease the thickness of the cell 10, and may further enhance the energy density of the cell 10.

As illustrated in FIGS. 1 to 14, a distance between a tail aluminum foil cutting position (the d position illustrated in FIGS. 1 to 14) and a left edge of the cell 10 is less than a distance between the first electrode tab 4 and the left edge of the cell 10, which may avoid turning of the cell 10 on the tail aluminum foil, and make the cell 10 have a better flatness.

In some embodiments, as illustrated in FIGS. 1 to 10, the finishing tape 6 of the cell 10 may not overlap with the first electrode tab 4 or the second electrode tab 5, such that the space utilization rate of the cell 10 may be improved, the thickness of the cell 10 may be reduced, and the energy density of the cell 10 may be further improved.

In some embodiments, a thickness of the insulating adhesive on the first electrode tab 4 may be less than or equal to a thickness of two layers of the separator 3. This arrangement may decrease an overall thickness of the cell 10, and further enhance the energy density of the cell 10. And the thicker the insulating adhesive is, the better the protection against the welding burrs is. In some embodiments, except for the insulating adhesive on the first electrode tab 4, other adhesive tapes on surfaces of a winding body may not overlap with the first electrode tab 4 or the second electrode tab 5, such that it may further enhance the energy density of the cell 10.

In some embodiments, a thickness of the finishing tape 6 is h3, a total thickness of four layers of the separator 3 in the innermost is h4, a thickness of the second electrode tab 5 is h5, a thickness of the second current collector 21 is h6, and a total of h3 and h4 is less than or equal to a total of h5 and h6. This arrangement may make the cell 10 have better flatness, further promote the space utilization rate of the cell 10, and further improve the energy density of the cell 10.

Different specific embodiments of the present application will be described below in accordance with FIGS. 1 to 14.

Figure 1:
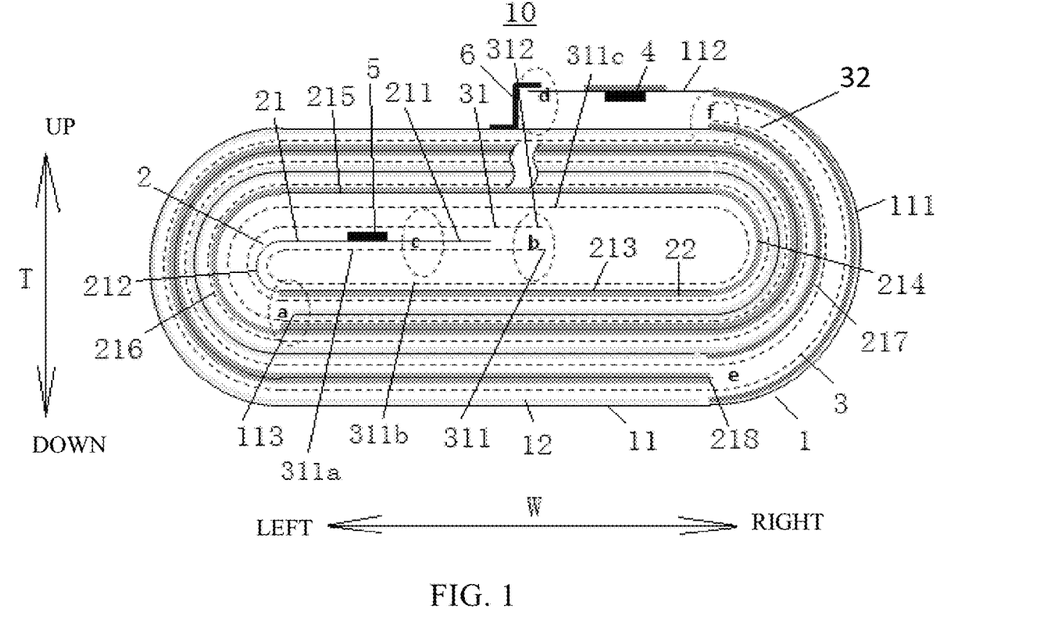
FIG. 1 illustrates a winding schematic view of a cell in accordance with an embodiment of the present disclosure.

According to a first specific embodiment of the present disclosure, as illustrated in FIG. 1, a cell 10 may include a first electrode sheet 1, a second electrode sheet 2, a separator 3, a first electrode tab 4, and a second electrode tab 5. The first electrode tab 4 is externally welded and located at the right side of the second electrode tab 5. Two surfaces of a starting end 113 of a first current collector 11 are provided with a first active material layer 12. A head of the first electrode sheet 1 has no opposite area where the second current collector 21 (i.e., blank copper foil) is opposite to the first current collector 11 (i.e., blank aluminum foil). A head of the separator 3 does not be wound with a blank layer. The first electrode tab 4 is applied with an insulating adhesive, the insulating adhesive is disposed between the electrode assembly and a packaging bag, and the first electrode tab 4 is fixed by an insulating adhesive or a hot melt adhesive. The material of the hot melt adhesive may include polyolefin, ethylene, ethylene copolymer, polyurethane, or polyamide or the like.

Figure 2:
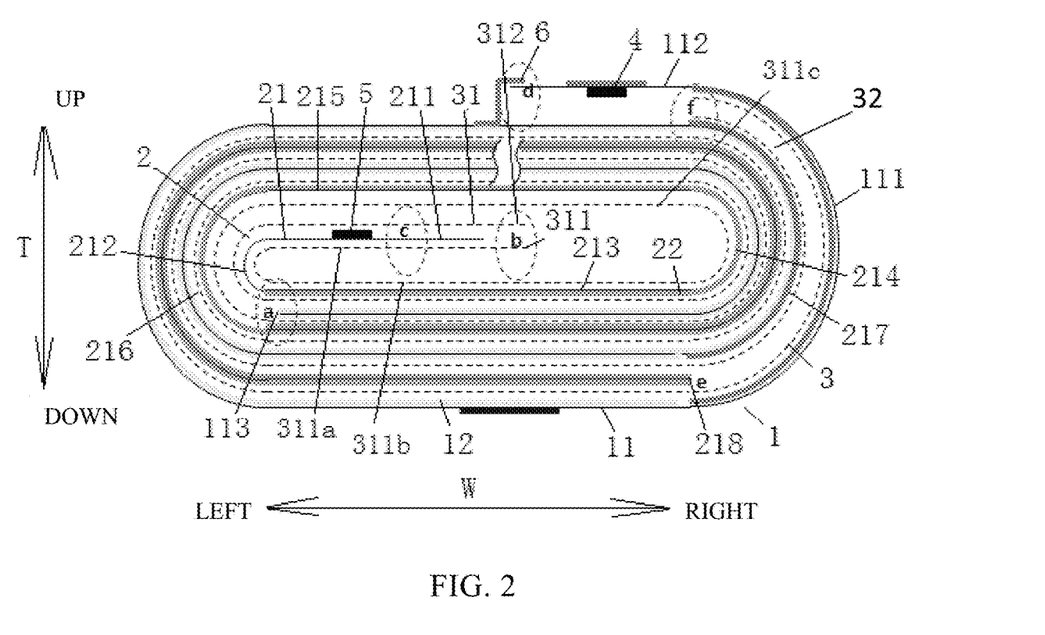
FIG. 2 illustrates a winding schematic view of a cell in accordance with another embodiment of the present disclosure.

According to a second specific embodiment of the present disclosure, as illustrated in FIG. 2, the cell 10 of the second embodiment is distinguished from that of the first embodiment is that the finishing section 112 of the first electrode sheet 1 uses the insulating adhesive and is applied with the hot melt adhesive on its opposite surface.

Figure 3:
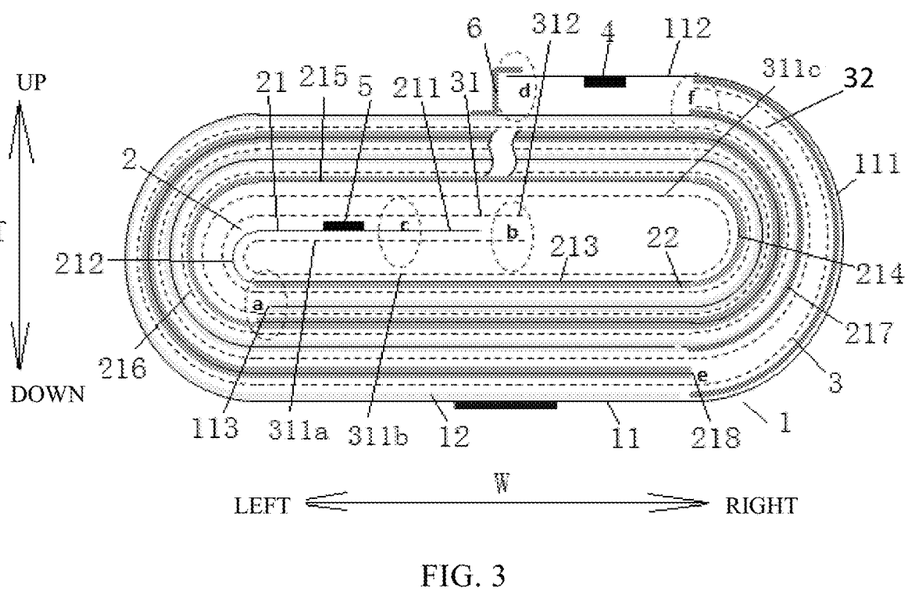
FIG. 3 illustrates a winding schematic view of a cell in accordance with another embodiment of the present disclosure.

According to a third specific embodiment of the present disclosure, as illustrated in FIG. 3, the cell 10 of the third embodiment is distinguished from that of the second embodiment is that the first electrode tab 4 is not provided with the insulating adhesive.

Figure 4:
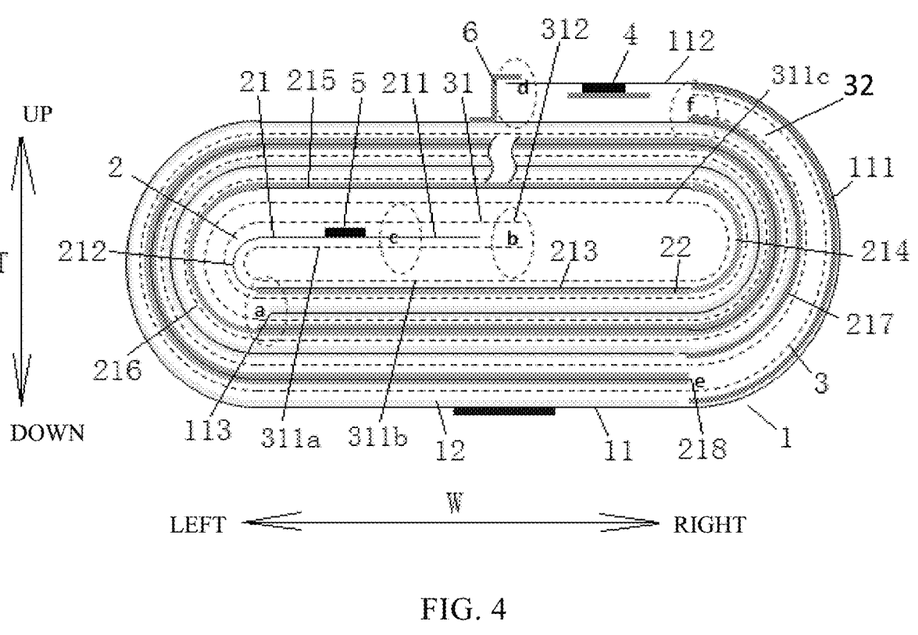
FIG. 4 illustrates a winding schematic view of a cell in accordance with another embodiment of the present disclosure.

According to a fourth specific embodiment of the present disclosure, as illustrated in FIG. 4, the cell 10 of the fourth embodiment is distinguished from that of the third embodiment is that a long surface at the first electrode tab 4 is applied with the insulating adhesive, such that the possibility of the burrs of the first electrode tab 4 piercing the separator 3 to contact with the first electrode sheet 1 is reduced, the risk of the short circuit is reduced, and the safety performance of the cell 10 may be improved. Wherein a long surface of the first electrode tab 4 refers to a surface of the first electrode tab 4 in a direction towards a center of the call 10, and a long surface described below refers to the above meaning.

According to a fifth specific embodiment of the present disclosure, as illustrated in FIG. 5, the cell 10 of the fifth embodiment is distinguished from that of the third embodiment is that a surface of the first electrode tab 4 in a direction towards the center of the cell 10 is applied with the insulating adhesive, and a surface of the finishing section 112 in a direction away from the center of the cell 10 and corresponding to the position of the first electrode tab 4 is also applied with the insulating adhesive. This arrangement may reduce the possibility of the burrs of the first electrode tab 4 piercing the separator 3 to contact with the first electrode sheet 1, and may reduce the risk of short circuit caused by the burrs of the first electrode tab 4 piercing the packaging bag, thereby improving the safety performance of the cell 10.

According to a sixth specific embodiment of the present disclosure, as illustrated in FIG. 6, the cell 10 may include the first electrode sheet 1, the first electrode tab 4, the second electrode sheet 2, and the second electrode tab 5. The first electrode tab 4 is externally welded and located at the right side of the second electrode tab 5. Two surfaces of the starting end 113 of the first current collector 11 are provided with a first active material layer 12. The head of the first electrode sheet 1 has no opposite area where the second current collector 21 (i.e., blank copper foil) is opposite to the first current collector 11 (i.e., blank aluminum foil). The head of the separator 3 does not be wound with a blank layer. A folded-back part (311d, 312d) of the separator 3 is disposed between the first electrode tab 4 and the second electrode tab 5. The first electrode tab 4 is applied with an insulating adhesive or a hot melt adhesive. In a winding direction of the cell 10, the separator 3 at the f position illustrated in FIG. 6 extends beyond the tail end of the insulating adhesive, or aligns with the tail end of the insulating adhesive, or is within the tail end of the insulating adhesive. The difference between FIG. 6 and FIG. 1 is that the separator 3 is folded back at the starting position of the separator 3, and when the folded-back part is disposed between the first electrode tab 4 and the second electrode tab 5, which may make the cell 10 have the better flatness, thereby further improving the energy density of the cell 10.

According to a seventh specific embodiment of the present disclosure, as illustrated in FIG. 7, the cell 10 of the seventh embodiment is distinguished from that of the sixth embodiment is that the head of the second current collector 21 (i.e., copper foil) extends towards a starting part of the separator 3 and is shorter than the starting position of the separator 3, and the head copper foil is pre-bending in advance. The separator 3 at the f position illustrated in FIG. 6 may be longer than the tail end of the insulating adhesive, or align with the tail end of the insulating adhesive, or be shorter than the tail end of the insulating adhesive.

According to an eighth specific embodiment of the present disclosure, as illustrated in FIG. 8, the cell 10 may include the first electrode sheet 1, the first electrode tab 4, the second electrode sheet 2, and the second electrode tab 5. The first electrode tab 4 is externally welded and located at the left side of the second electrode tab 5. Two surfaces of the starting end 113 of the first current collector 11 are provided with a first active material layer 12. The head of the first electrode sheet 1 has no opposite area where the second current collector 21 (i.e., blank copper foil) is opposite to the first current collector 11 (i.e., blank aluminum foil). The head of the separator 3 is not folded back at the starting position of the separator 3, and thus does not be wound with a vacant layer. The first electrode tab 4 is applied with an insulating adhesive, and the first electrode tab 4 is fixed by using the insulating adhesive or the hot melt adhesive, or the tail end of the first current collector 11 is fixed by the insulating adhesive and oppositely applying the hot melt adhesive. The cell 10 of the eighth embodiment is distinguished from that of the first embodiment is that the first electrode tab 4 is located at a left side of the second electrode tab 5.

According to a ninth specific embodiment of the present disclosure, as illustrated in FIG. 9, the cell 10 of the ninth embodiment is distinguished from that of the eighth embodiment is that the head of the separator 3 is folded back to form a first separator bending section 311d and a second separator bending section 312d.

According to a tenth specific embodiment of the present disclosure, as illustrated in FIG. 10, the cell 10 of the tenth embodiment is distinguished from that of the ninth embodiment is that a starting end of the second current collector 21 (i.e., copper foil) extends towards the starting position of the separator 3, in a winding direction of the cell 10, the head of the second current collector 21 is shorter than the starting position of the separator 3, and the head of the second current collector 21 is pre-bent to form a bending portion 219.

Figure 11:
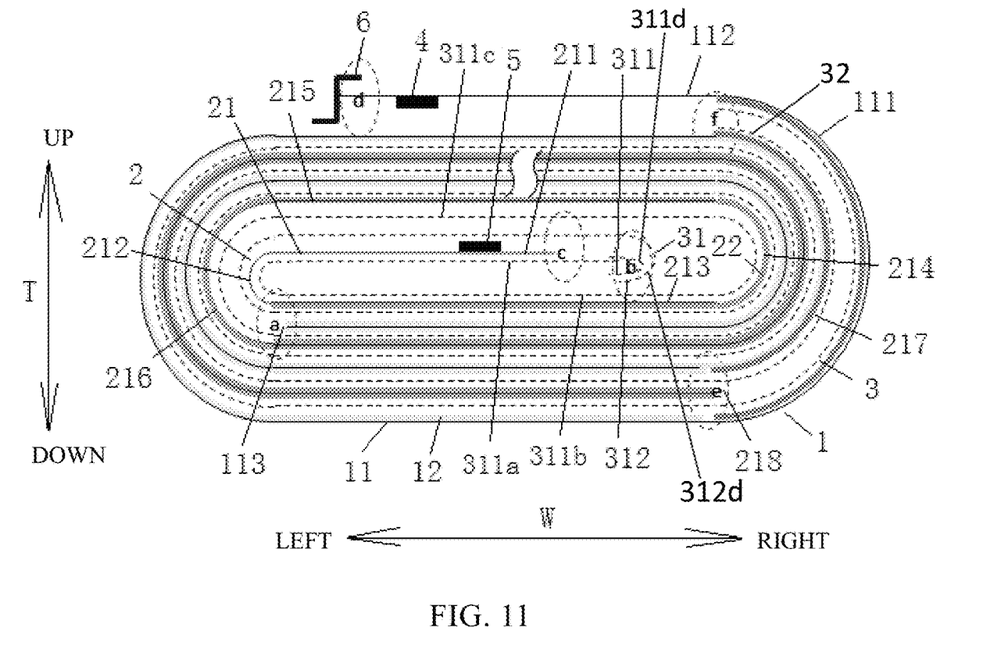
FIG. 11 illustrates a winding schematic view of a cell in accordance with another embodiment of the present disclosure.

According to an eleventh specific embodiment of the present disclosure, as illustrated in FIG. 11, the cell 10 of the eleventh embodiment is distinguished from that of the ninth embodiment is that a long surface of the first electrode tab 4 is not provided with an insulating adhesive, and a surface of a finishing section 112 of a first current collector 11 corresponding to the first electrode tab 4 is not provided with the insulating adhesive.

Figure 12:
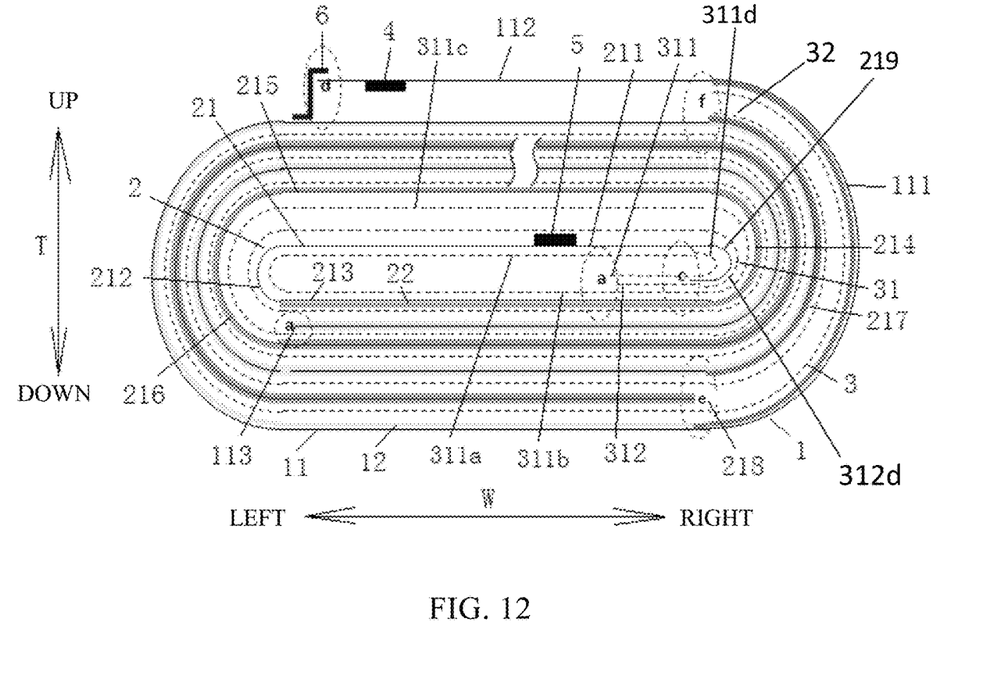
FIG. 12 illustrates a winding schematic view of a cell in accordance with another embodiment of the present disclosure.

According to a twelfth specific embodiment of the present disclosure, as illustrated in FIG. 12, the cell 10 of the twelfth embodiment is distinguished from that of the tenth embodiment is that the first electrode tab 4 is not provided with the insulating adhesive.

Figure 13:
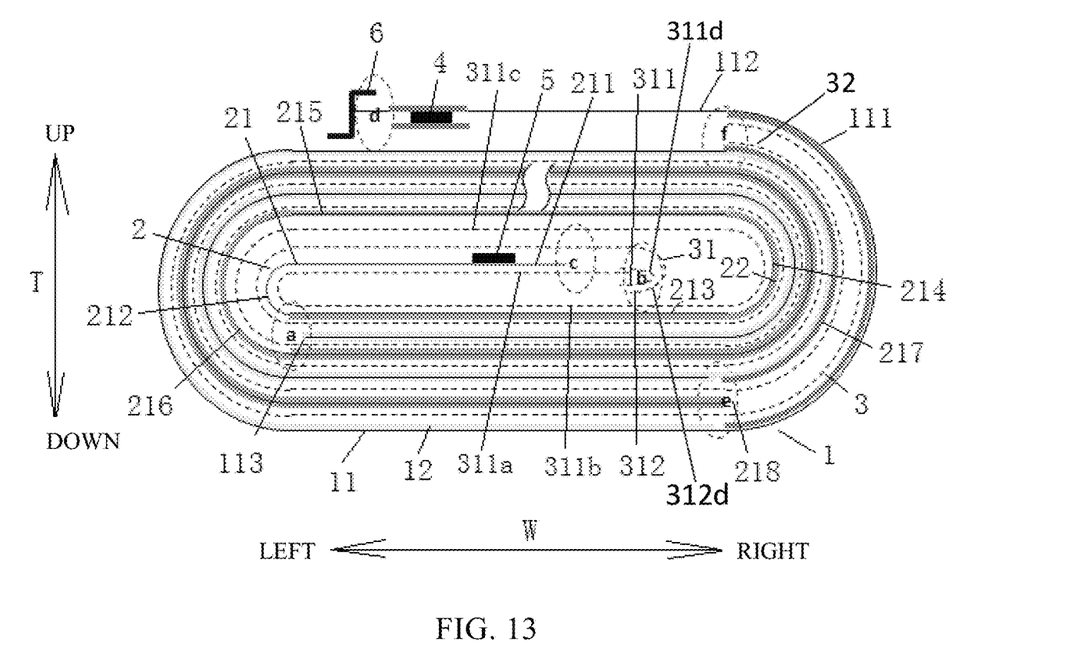
FIG. 13 illustrates a winding schematic view of a cell in accordance with another embodiment of the present disclosure.

According to a thirteenth specific embodiment of the present disclosure, as illustrated in FIG. 13, the cell 10 of the thirteenth embodiment is distinguished from that of the ninth embodiment is that a surface of the first electrode tab 4 towards the center of the cell 10 is applied with the insulating adhesive, such that the risk of short circuit caused by the burrs of the first electrode tab 4 piercing the separator 3 to contact with the first electrode sheet 1 may be reduced.

Figure 14:
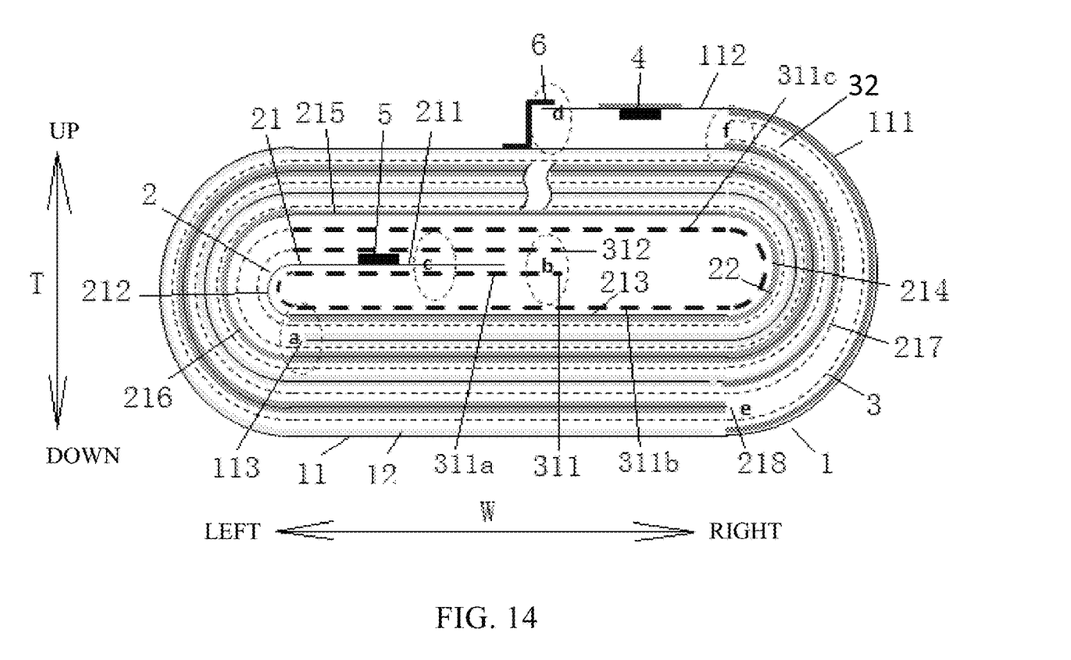
FIG. 14 illustrates a winding schematic view of a cell in accordance with another embodiment of the present disclosure.

According to a fourteenth specific embodiment of the present disclosure, as illustrated in FIG. 14, the separator 3 of this embodiment is provided in accordance with a winding manner illustrated in FIG. 14.

The battery according to embodiments of the present disclosure includes the cell 10 according to the above embodiments. The cell 10 may avoid a short circuit of the battery, and may improve the safety of the battery. Furthermore, the cell 10 also may make a thickness of the battery become smaller, enhance the energy density of the battery, and promote the operational performance of the battery.

An electronic device is provided according to embodiments of the present disclosure, the electronic device includes a housing and a battery. The battery includes the cell 10 according to the above embodiments. The battery may avoid a short circuit of the electronic device, and may improve the safety of the electronic device. Furthermore, the battery also may make a thickness of the electronic device become smaller, enhance the energy density of the electronic device, and promote the operational performance of the electronic device.

Reference throughout this specification to "an embodiment" "some embodiments" "an illustrative embodiment" "an example" "a specific example" or "some examples" means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

What is claimed is:

1. A cell, comprising:
   a first electrode sheet comprising
      a first current collector and
      a first active material layer disposed on a surface of the first current collector;
   a second electrode sheet comprising
      a second current collector and
      a second active material layer disposed on a surface of the second current collector,
      wherein, the second current collector comprises a starting section and
         a first bending segment connected to the starting section;
   an electrolyte;
   a separator disposed between the first electrode sheet and the second electrode sheet;
   wherein two surfaces of a starting end of the first current collector in a winding direction of the cell are provided with the first active material layer,
   a first electrode tab disposed on a surface of the first current collector;
   a second electrode tab disposed on a surface of the starting section of the second current collector; wherein the first current collector comprises a first current collector bending segment and a finishing section, the first current collector bending segment is connected to the finishing section, the finishing section is terminated at a tail cutting position, the finishing section is not bent and is not coated with the first active material layer, and the first electrode tab is disposed on a surface of the finishing section of the first current collector; and
   the separator comprises a wound structure, the wound structure comprising a separator starting section having a starting edge in an innermost layer of the wound structure, the separator starting section beginning at a location corresponding to an electrode tab of the first current collector or the second current collector, wherein a sum of a thickness of the first electrode tab and a thickness of the finishing section of the first current collector is h1, and a sum of a thickness of the second electrode tab and a thickness of the starting section of the second current collector is h2, an absolute value of a difference between h1 and h2 is greater than or equal to 0 µm, and less than or equal to 30 µm.

2. The cell according to claim 1, wherein the second current collector further comprises:
   a first intermediate segment connected to the first bending segment;
   a second bending segment connected to the first intermediate segment;
   a second intermediate segment connected to the second bending segment; and
   a third bending segment connected to the second intermediate segment;
   wherein no more than two layers of the separator are disposed between the starting section and the first intermediate segment.

3. The cell according to claim 2, wherein no more than four layers of the separator are disposed between the first intermediate segment and the second intermediate segment.

4. The cell according to claim 1, wherein the separator starting section extends beyond an end of the starting section of the second current collector in the winding direction of the cell.

5. The cell according to claim 2, wherein two surfaces of the starting section and the first bending segment are not provided with the second active material layer, and in a direction facing towards a center of the cell, a surface of the second current collector between the first intermediate segment and the third bending segment is not provided with the second active material layer.

6. The cell according to claim 1, wherein the first electrode tab does not overlap with the second electrode tab in a thickness direction of the cell.

7. The cell according to claim 1, wherein two surfaces of the first current collector bending segment and the finishing section are not provided with the first active material layer.

8. The cell according to claim 7, wherein the finishing section of the first current collector does not overlap with the starting section of the second current collector in a thickness direction of the cell.

9. The cell according to claim 7, wherein
   in a width direction of the cell, a distance between the first electrode tab and an end of the finishing section is greater than or equal to 3 mm, and a distance between the second electrode tab and an end of the starting section is greater than or equal to 3 mm.

10. The cell according to claim 7, wherein
    along the winding direction of the cell, the first current collector bending segment extends beyond a tail end of the second current collector, and a bending segment of the second current collector corresponding to the first current collector bending segment is defined as an additional bending segment; and the separator finishing section is disposed between the first current collector bending segment and the additional fifth bending segment, and the separator finishing section comprises at least two layers of the separator.

11. The cell according to claim 10, wherein in a thickness direction of the cell, the separator finishing section does not overlap with the finishing section of the first current collector.

12. The cell according to claim 7, wherein another surface of the finishing section of the first current collector corresponding to the first electrode tab is provided with an insulating adhesive or a hot melt adhesive.

13. The cell according to claim 7, wherein in the winding direction of the cell, an end of the finishing section of the first current collector is provided with a finishing tape to fix the finishing section; and a hot melt adhesive is disposed on a side of the cell corresponding to the finishing tape.

14. The cell according to claim 4, wherein the separator starting section comprises a first separator starting segment and a second separator starting segment, and the starting section of the second current collector is disposed between the first separator starting segment and the second separator starting segment;
in the winding direction of the cell, a portion from a winding start point of the first separator starting segment to a position where the first separator starting segment is bent for the first time is defined as a first separator bending segment, and a portion from a winding start point of the second separator starting segment to a position where the second separator starting segment is bent for the first time is defined as a second separator bending segment;
the first separator starting segment further comprises a first separator segment, a second separator segment and a third separator segment, the first separator segment is disposed between the first separator bending segment and the second separator segment, and the second separator segment is disposed between the first separator segment and the third separator segment,
wherein in a thickness direction of the cell, the first separator bending segment and the second separator bending segment are respectively disposed between the first separator segment and the second separator segment.

15. The cell according to claim 14, further comprising:
a first electrode tab disposed on a surface of the first current collector; and
a second electrode tab disposed on a surface of the starting section of the second current collector,
wherein in a thickness direction of the cell, the first electrode tab and the second electrode tab do not respectively overlap with the first separator bending segment.

16. A battery comprising a cell, wherein the cell comprises:
a first electrode sheet comprising
a first current collector and
a first active material layer disposed on a surface of the first current collector;
a second electrode sheet comprising
a second current collector and
a second active material layer disposed on a surface of the second current collector,
wherein, the second current collector comprises a starting section and
a first bending segment connected to the starting section;
an electrolyte; and
a separator disposed between the first electrode sheet and the second electrode sheet;
wherein two surfaces of a starting end of the first current collector in a winding direction of the cell are provided with the first active material layer,
a first electrode tab disposed on a surface of the first current collector;
a second electrode tab disposed on a surface of the starting section of the second current collector; wherein the first current collector comprises a first current collector bending segment and a finishing section, the first current collector bending segment is connected to the finishing section, the finishing section is terminated at a tail cutting position, the finishing section is not bent and is not coated with the first active material layer, and the first electrode tab is disposed on a surface of the finishing section of the first current collector; and
the separator comprises a wound structure, the wound structure comprising a separator starting section having a starting edge in an innermost layer of the wound structure, the separator starting section beginning at a location corresponding to an electrode tab of the first current collector or the second current collector, wherein a sum of a thickness of the first electrode tab and a thickness of the finishing section of the first current collector is h1, and a sum of a thickness of the second electrode tab and a thickness of the starting section of the second current collector is h2, an absolute value of a difference between h1 and h2 is greater than or equal to 0 μm, and less than or equal to 30 μm.

17. An electronic device, comprising:
a housing; and
a battery disposed in the housing comprising a cell,
wherein the cell comprises:
a first electrode sheet comprising
a first current collector and
a first active material layer disposed on a surface of the first current collector;
a second electrode sheet comprising
a second current collector and
a second active material layer disposed on a surface of the second current collector,
wherein, the second current collector comprises a starting section and
a first bending segment connected to the starting section;
an electrolyte; and
a separator disposed between the first electrode sheet and the second electrode sheet, a first electrode tab disposed on a surface of the first current collector;
a second electrode tab disposed on a surface of the starting section of the second current collector; wherein the first current collector comprises a first current collector bending segment and a finishing section, the first current collector bending segment is connected to the finishing section, the finishing section is terminated at a tail cutting position, the finishing section is not bent and is not coated with the first active material layer, and the first electrode tab is disposed on a surface of the finishing section of the first current collector; and the separator comprises a wound structure, the wound structure comprising a separator starting section having a starting edge in an innermost layer of the wound structure, the separator starting section beginning at a location corresponding to an electrode tab of the first current collector or the second current collector, wherein a sum of a thickness of the first electrode tab and a thickness of the finishing section of the first current collector is h1, and a sum of a thickness of the second electrode tab and a thickness of the starting section of the second current collector is h2, an absolute value of a difference between h1 and h2 is greater than or equal to 0 μm, and less than or equal to 30 μm; and wherein two surfaces of a starting end of the first current collector in a winding direction of the cell are provided with the first active material layer.

* * * * *